(12) United States Patent
Singer

(10) Patent No.: US 12,346,313 B2
(45) Date of Patent: Jul. 1, 2025

(54) METHODS AND SYSTEMS FOR GENERATING LOGICAL QUERIES

(71) Applicant: Noetica Ltd., Crawley (GB)

(72) Inventor: Danny Singer, Robertsbridge (GB)

(73) Assignee: Noetica Ltd., Crawley (GB)

( * ) Notice: Subject to any disclaimer, the term of this patent is extended or adjusted under 35 U.S.C. 154(b) by 0 days.

(21) Appl. No.: 17/995,804

(22) PCT Filed: Apr. 9, 2021

(86) PCT No.: PCT/GB2021/050880
§ 371 (c)(1),
(2) Date: Oct. 7, 2022

(87) PCT Pub. No.: WO2021/205186
PCT Pub. Date: Oct. 14, 2021

(65) Prior Publication Data
US 2023/0153297 A1    May 18, 2023

(30) Foreign Application Priority Data

Apr. 9, 2020  (GB) ..................................... 2005319

(51) Int. Cl.
*G06F 16/242* (2019.01)
*G06F 16/2455* (2019.01)

(52) U.S. Cl.
CPC ........ *G06F 16/2428* (2019.01); *G06F 16/242* (2019.01); *G06F 16/24558* (2019.01)

(58) Field of Classification Search
CPC .... G06F 16/221; G06F 16/278; G06F 16/254; G06F 16/2428; G06F 16/2423; G06F 16/24558; G06F 16/242
See application file for complete search history.

(56) References Cited

U.S. PATENT DOCUMENTS

| | | |
|---|---|---|
| 6,003,034 A | 12/1999 | Tuli |
| 6,326,962 B1 | 12/2001 | Szabo |
| 11,392,632 B1 * | 7/2022 | Nelson .................. G06F 16/438 |
| 2004/0202308 A1 * | 10/2004 | Baggenstoss ....... H04M 3/5175 |
| | | 379/265.06 |
| 2005/0283466 A1 * | 12/2005 | Dettinger ............ G06F 16/2425 |
| 2006/0200438 A1 * | 9/2006 | Schloming ............ G06F 16/284 |

(Continued)

OTHER PUBLICATIONS

International Search Report and Written Opinion received in PCT/GB2021/050880, mailed Jun. 8, 2021.

*Primary Examiner* — Vaishali Shah
(74) *Attorney, Agent, or Firm* — Knobbe, Martens, Olson & Bear, LLP

(57) ABSTRACT

A computer-implemented method for generating and sending a machine processable form of a logical query, comprising: providing, on a display device of a computing device, two or more shapes that can be manipulated by a user to form a diagram representing a logical query, wherein the two or more shapes correspond to respective data sets; for each shape of the two or more shapes, determining, by the computing device, one or more highest intersection cardinality regions within the shape; based on the one or more highest intersection cardinality regions, generating, by the computing device, a machine processable form of the logical query; and sending, by the computing device, the machine processable form of the logical query to a query processing engine.

16 Claims, 5 Drawing Sheets

(56) References Cited

U.S. PATENT DOCUMENTS

| | | | |
|---|---|---|---|
| 2006/0271505 A1 | 11/2006 | Vierich et al. | |
| 2012/0221553 A1* | 8/2012 | Wittmer | G06F 16/904 |
| | | | 707/E17.014 |
| 2013/0086057 A1* | 4/2013 | Harrington | G06F 16/951 |
| | | | 707/E17.014 |
| 2015/0339827 A1* | 11/2015 | Oka | G06T 7/13 |
| | | | 382/199 |
| 2016/0092557 A1* | 3/2016 | Stojanovic | G06F 16/248 |
| | | | 707/723 |
| 2018/0285399 A1* | 10/2018 | Altizer | G06F 16/2453 |
| 2019/0121826 A1 | 4/2019 | LeVell | |
| 2020/0401598 A1* | 12/2020 | Mehrotra | G06F 16/2282 |
| 2021/0406343 A1* | 12/2021 | Sabra | G06F 16/1748 |

\* cited by examiner

METHODS AND SYSTEMS FOR GENERATING LOGICAL QUERIES

FIELD OF THE INVENTION

The invention relates generally to methods and systems for generating machine processable logical queries, and more particularly to methods and systems for generating machine processable logical queries based on manipulation of a diagram such as an Euler diagram or Venn diagram or similar.

BACKGROUND OF THE INVENTION

Predicate logic is widely used in computing to describe things such as database queries, spreadsheet formulae, business intelligence tools, customer contact or marketing campaign creation and management.

Predicate logic is generally conveyed as a database query or similar using a high level programming language such as database Structured Query Languages (SQL), macro or C#, which requires the user to possess a certain level of technical skill.

Diagrams such as Euler diagrams and Venn diagrams or similar can be used to provide a visual representation of predicate logic using intersecting shapes. For example, such a diagram might consist of two intersecting circles, one representing the set of integers greater than five and the other representing the set of integers less than 10. The area where the two circles overlap represents the intersection of these two sets, i.e. the set of integers greater than five and less than ten.

Unlike database queries, such diagrams are easily understood and manipulated by users that do not possess technical skill in predicate logic or SQL, meaning unskilled users can use these diagrams to easily formulate visual representations of predicate logic.

There is a need for systems and methods that can correctly interpret the predicate logic represented by visual diagrams and convert it into a machine processable logical query, such as a database query or similar.

SUMMARY OF THE INVENTION

According to a first aspect of the invention, there is provided a computer-implemented method for generating and sending a machine processable form of a logical query, comprising: providing, on a display device of a computing device, two or more shapes that can be manipulated by a user to form a diagram representing the logical query, wherein the two or more shapes correspond to respective data sets; for each shape of the two or more shapes, determining, by the computing device, one or more highest intersection cardinality regions within the shape; based on the one or more highest intersection cardinality regions, generating, by the computing device, a machine processable form of the logical query; and sending, by the computing device, the machine processable form of the logical query to a query processing engine.

This method assists a user in the technical task of generating a logical query. This allows the user to extract data from a database or similar query processing engine without requiring technical skill in predicate logic and programming.

The method also enables a computing device to identify the regions of interest in the diagram representation generated by the user without the need for an explicit indication from the user, thereby reducing the number of steps the user must perform to generate a query.

Since the underlying query can be manipulated graphically, the method provides for the faster and more efficient manipulation of data, regardless of the technical competence of the user. That is, even if the user was technically competent the graphical and visual mechanism is both a faster, more efficient and more accurate way of accessing and/or manipulating underlying data; thus providing more than a simplification of a user's actions and an improved mechanism of accessing and manipulating data. Moreover, since the data is queried visually, the computer is responsible for the data selection facilitating a more accurate query and reducing processing load.

In this regard, logical queries can also be pre-loaded (i.e. the data initially queried before the final shape is chosen) based on the movement of the shapes or the chosen shapes, thus significantly reducing and improving data retrieval and processing speed.

The method provides for faster and more efficient data manipulation regardless of the technical competence of the user in that the use of the shapes rather than directly inputting SQL queries reduces the number of user interactions required to make (or change) a query. Further the maneuvering of shapes visually is a dramatically faster process than the typing of a query and less likely to result in mistakes or errors.

The available data can be visually presented and a selection chosen immediately, without any detailed knowledge of the structure of the data. For example, the data can be selected irrespective of the table structure of a relational database.

A computer performing the method becomes an improved computer as it becomes more programmable; it is quicker and easier to manipulate data, such as initiating the movement of data, stored on the computer. There is a direct effect on the underlying data stored on the computer. The method directly results in an improved continued and guided human-machine interaction process assisting the user in the technical task of accessing and manipulating data, for example as stored in a relational database.

The intersection cardinality of a region within a shape is equal to the number of other shapes that intersect the shape in that region. The highest intersection cardinality regions within a shape are the regions having the largest intersection cardinality values, i.e. are the regions within a shape which are overlapped by the largest number of other shapes.

The machine processable form of the logical query may be a database query, such as a SQL query. The machine processable form of the logical query may alternatively be in another form such as a logical query for a search engine or a spreadsheet formula.

The query processing engine may be a database. The query processing engine by alternatively be another processing engine such as a search engine or a spreadsheet.

Preferably, determining the one or more highest intersection cardinality regions within a given shape comprises: generating, by the computing device, an intersection set, the intersection set comprising all other shapes that intersect the given shape; determining, by the computing device, a highest intersection cardinality value of the given shape; generating, by the computing device, a highest intersection cardinality index set, the highest intersection cardinality index set comprising all subsets of the intersection set that have a cardinality equal to the highest intersection cardinality value; and identifying, by the computing device, elements of the highest intersection cardinality index set that contain shapes having a common intersection with each other and with the given shape.

The highest intersection cardinality value of a shape is the intersection cardinality of the region of the shape that has the largest intersection cardinality. For example, if a shape has one region which is overlapped by one shape (intersection cardinality of one), and another region which is overlapped by two shapes (intersection cardinality of two), then the highest intersection cardinality value of the shape will be two.

Preferably, the method further comprises: generating, by the computing device, an n×n array, wherein n represents a total number of shapes, wherein each row and each column of the array corresponds to a respective shape, and wherein an element of the array has value 1 if respective shapes corresponding to the row and column of the element intersect, and value 0 otherwise; and wherein generating the intersection set comprises: determining, by the computing device, a row corresponding to the shape; identifying, by the computing device, elements of the row that have value 1; determining, by the computing device, respective shapes corresponding to respective columns of the identified elements; and generating, by the computing device, a set comprising the respective shapes (in other words, thus generating the collection of shapes that intersect the given shape).

The array may be a matrix, a table, or any other data structure capable of representing a two-dimensional array. Although the values in the table are given as 0 and 1, any equivalent values capable of binary representation could be used.

Preferably, determining the highest intersection cardinality value of the shape comprises: (i) determining, by the computing device, utilising the n×n array, an intersection value of the shape, wherein the intersection value is equal to the number of shapes that intersect with the shape; (ii) setting, by the computing device an index equal to the intersection value; (iii) generating, by the computing device, an index set comprising all subsets of the intersection set that have a set cardinality equal to the index; (iv) for each element of the index set, determining, by the computing device, whether all shapes in the element intersect with the shape at a common intersection; and (v) if all shapes in the element intersect with the shape at a common intersection, setting, by the computing device, the highest intersection cardinality value equal to the index, and otherwise decreasing, by the computing device, the value of the index by 1 and repeating steps (iii) and (iv).

The set cardinality of a set is the number of elements in the set. This is distinct from intersection cardinality.

Preferably, identifying elements of the highest intersection cardinality index set that contain shapes having a common intersection with each other and with the shape comprises: iterating, by the computing device, through the elements of the highest intersection cardinality index set; and for each element, determining, by the computing device, whether all shapes in the element intersect with the shape at a common intersection.

Preferably, the method further comprises: constructing, by the computing device, a set theory expression V which initially is equal to the empty set; wherein determining one or more highest intersection cardinality regions within the shape further comprises: for each determined highest intersection cardinality region within the shape, appending, by the computing device, a term $$\left(\left(\bigcap_{S_j \in \sigma} S_j\right) \cap S_i\right)$$

to V such that $$V = V \cup \left(\left(\bigcap_{S_j \in \sigma} S_j\right) \cap S_i\right)$$

where: $S_i$ represents a data set corresponding to the shape; $\sigma$ represents a set of data sets corresponding to shapes that intersect the shape at the highest intersection cardinality region; and $S_j$ represent respective data sets corresponding to respective elements of $\sigma$.

Preferably, generating the machine processable form of the logical query comprises, subsequent to determining the one or more highest intersection cardinality regions within the shape, converting, by the computing device, the set theory expression V into the machine processable form of the logical query.

Preferably, the method further comprises determining, by the computing device, whether the term already exists in V prior to the appending, wherein the term is only appended to V if an identical term does not already exist in V.

Preferably, the method further comprises determining, by the computing device, all intersection regions between the two or more shapes.

Preferably, the method further comprises shading, on the display device, the one or more highest intersection cardinality regions.

According to another aspect of the invention, there is provided a computer-implemented method of retrieving data from a database, comprising: using the method of any preceding claim to generate, by a computing device, a machine processable form of a logical query and send, by the computing device, the machine processable form of the logical query to the query processing engine, wherein the machine processable form of the logical query is a database query and the query processing engine is the database; sending, by the computing device, the database query to the database; receiving, at the database, the database query; using the database query to retrieve, at the database, the data.

Preferably, the method further comprises sending the data to a receiving device. Preferably, the method is used in a call centre, wherein the data comprises one or more phone numbers, and wherein the method further comprises using at least one of the one or more phone numbers to make a phone call.

Alternatively, the data may comprise one or more identifiers such as email addresses, IP addresses or phone numbers, and the method may further comprise using at least one of the identifiers to send a message to one or more recipients associated with the identifiers, such as a message alerting recipients to an important local event or a warning. Such a message may be sent simultaneously to multiple recipients.

According to a further aspect of the invention, there is provided computing device for generating and sending a machine processable form of a logical query, comprising: a processor; and a display device; wherein the processor is configured to perform the method of any of the first aspect.

According to yet another aspect of the invention, there is provided a system for making logical queries, comprising: a computing device configured to generate a machine processable form of a logical query and send the machine processable form of the logical query to a query processing engine according to the method of the first aspect; a query processing engine configured to: receive the machine processable form of the logical query from the computing device; extract data based on the machine processable form of the logical query; and send the data to a receiving device; and a receiving device configured to receive the data from the query processing engine.

BRIEF DESCRIPTION OF THE DRAWINGS

Examples of the present invention will now be described in detail with reference to the accompanying drawings, in which.

DETAILED DESCRIPTION OF THE INVENTION

In the following description aspects of the invention are described in the context of call centres. It will be appreciated that the invention has applications in contexts outside of call centres, specifically to any environment in which a logical query is generated. Other exemplary applications include generating search engine queries, filtering search results, and generating spreadsheet formulae.

Figure 1:
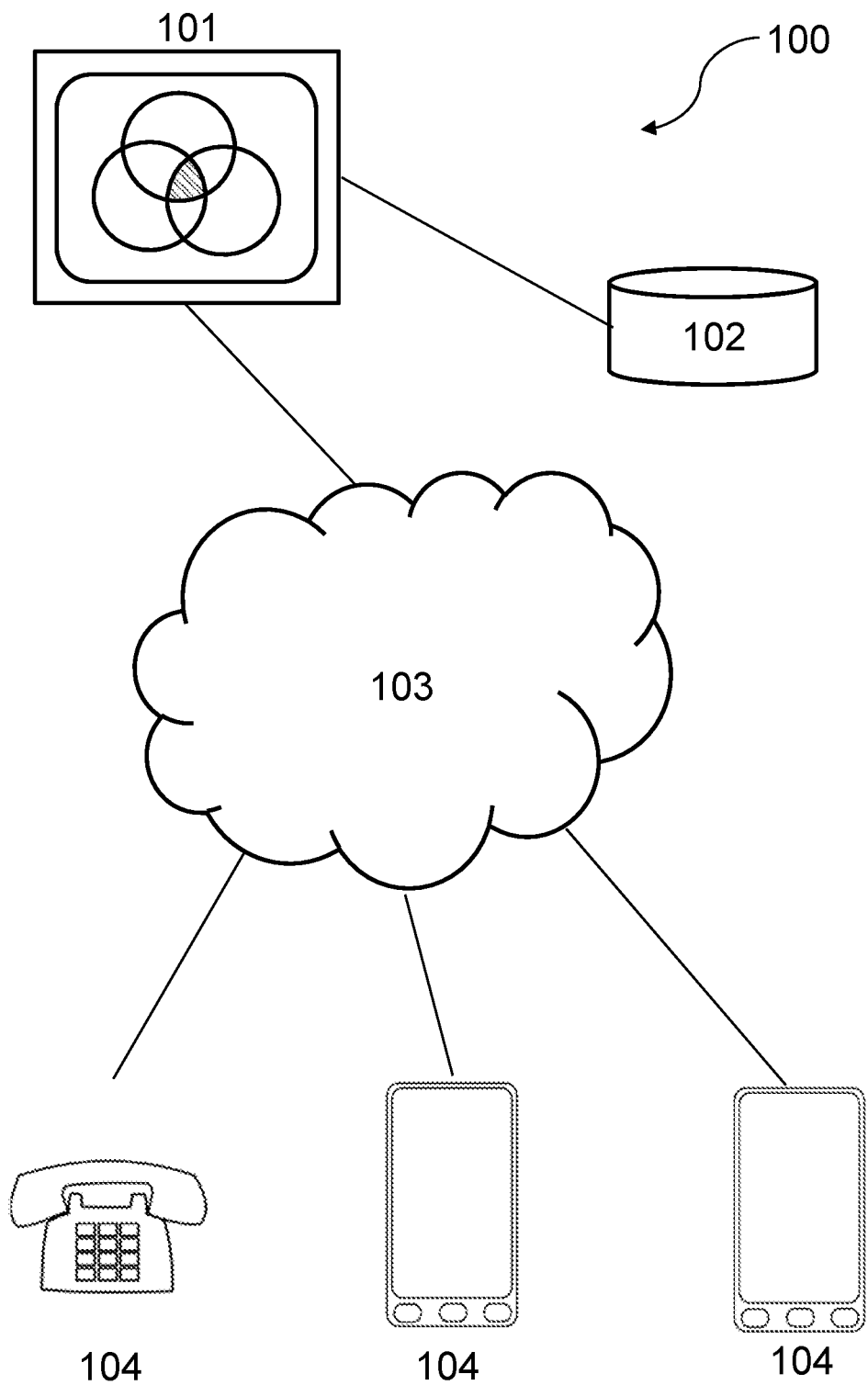
FIG. 1 illustrates in schematic form a system suitable for implementing aspects of the invention.

FIG. 1 shows an example system 100 suitable for implementing embodiments of the present invention.

The system 100 includes a computing device 101 communicatively coupled to a query processing engine 102 such as a database. The user computing device 101 may have a user interface and one or more input devices, such as a keyboard, mouse, touch screen or microphone. The computing device 101 may be any suitable device that a user can interact with, such as a personal computer, a tablet computer, a smartphone, or a laptop computer, or even a virtual and/or cloud based computer system.

This coupling between the computing device 101 and the query processing engine 102 may be via a data connection, for example the Internet or a private intranet. The user computing device 101 is also cable of communicating with one or more user equipments (UEs) 104 through an intermediary 103.

The intermediary 103 may be a communications network, the Internet, a private network, a telephone exchange, a combination of these, or any other physical or virtual system capable of providing communication between a user computing device 101 and one or more UEs 104.

The UEs 104 may be mobile phones, smartphones, landline telephones, tablet computers, personal computers, laptop computers, notebook computers or any other suitable user device.

Although the computing device 101 is illustrated with a direct connection to the query processing engine 102, embodiments are envisaged in which the communication between the computing device 101 and the query processing engine 102 is via the intermediary 103.

Figure 2:
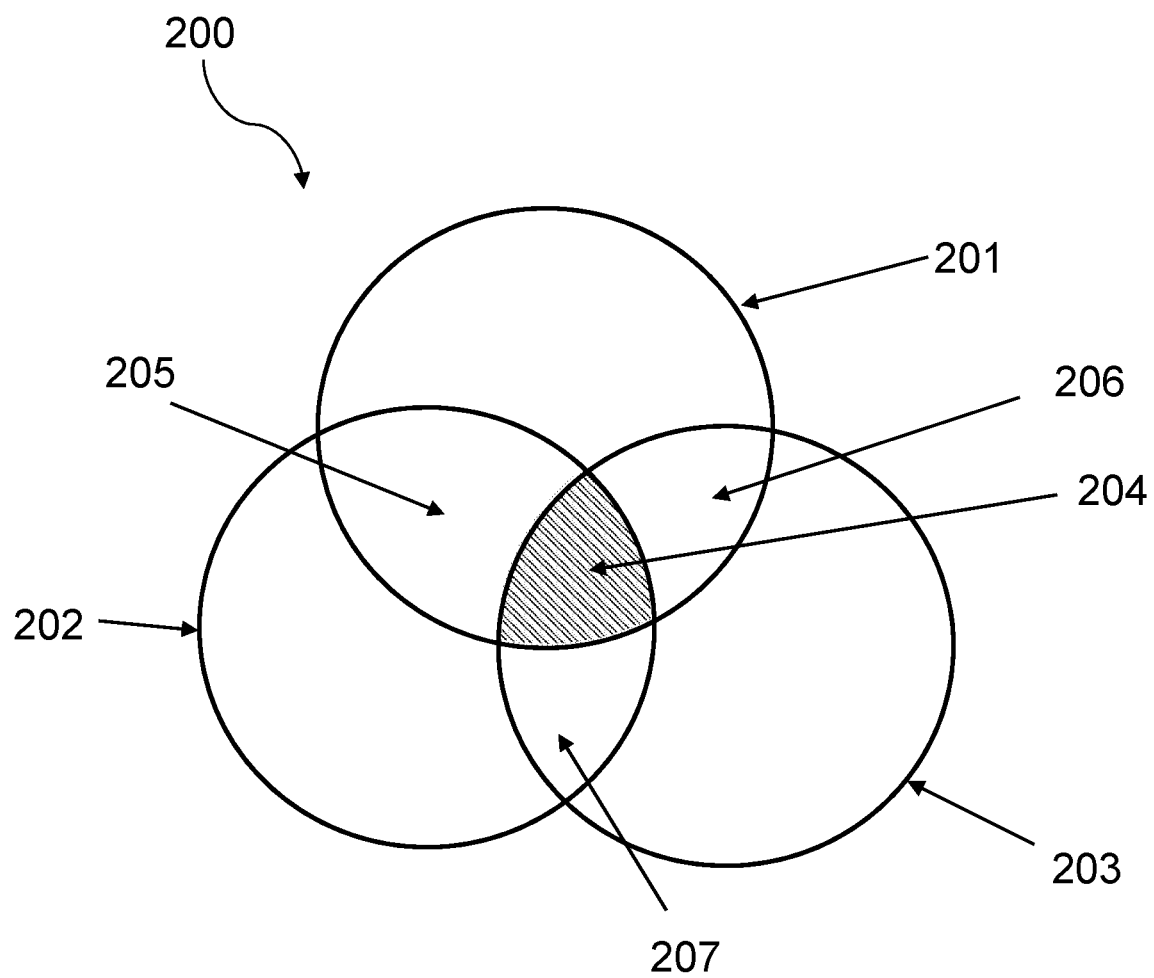
FIG. 2 is a diagram representing a logical query.
Figure 3:
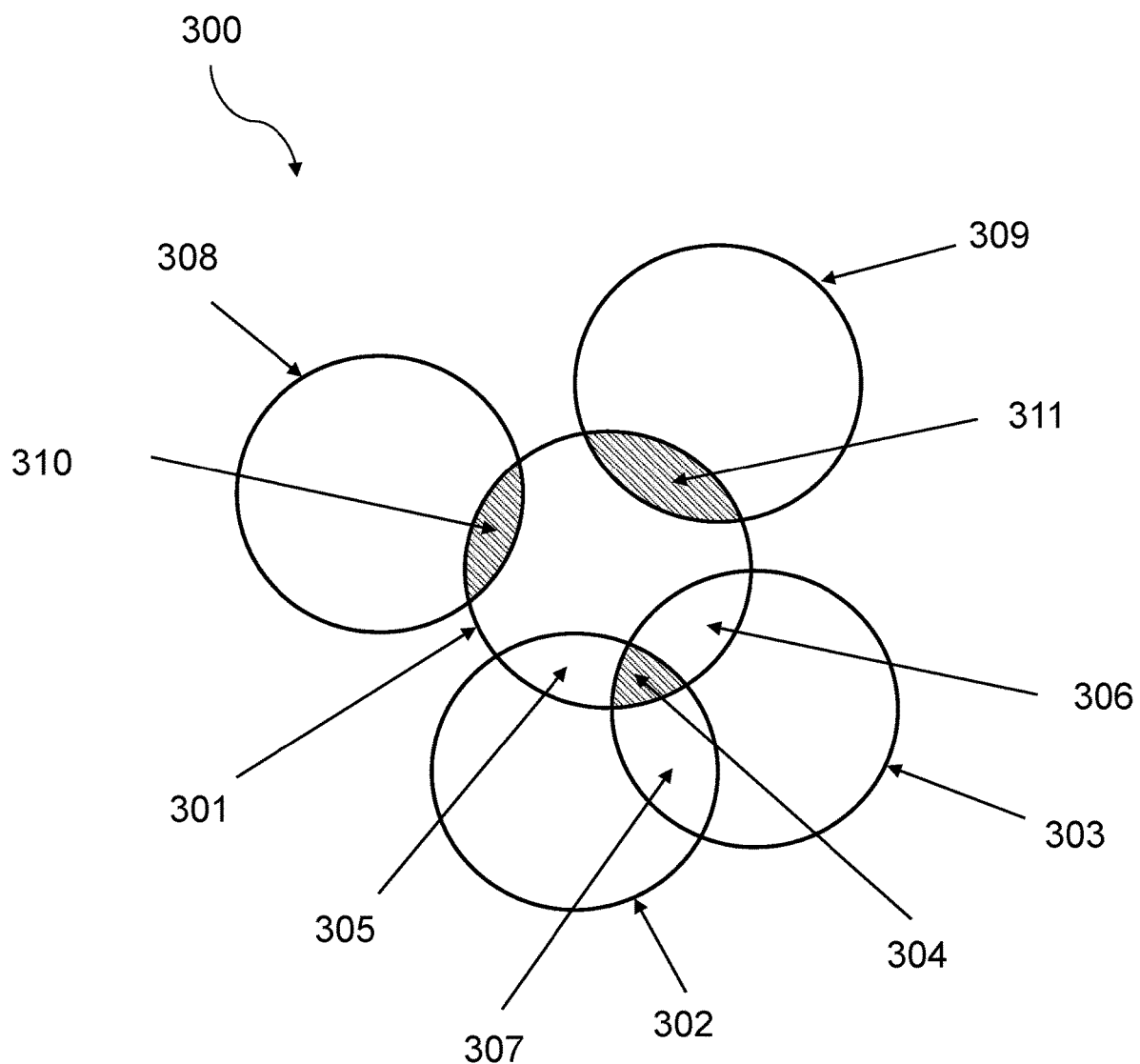
FIG. 3 is another diagram representing another logical query.

A user of the computing device 101 can use an input device to manipulate one or more shapes displayed on the user interface to form one or more diagrams representing a logical query (for example an Euler diagram or a Venn diagram or similar), such as those shown in FIG. 2 and FIG. 3.

As known to a person skilled in the art, Euler diagrams and Venn diagrams have a collection of several shapes, each shape representing a data set. These shapes are often circles but can be any shape.

A data set, or more generally a set, is a collection of elements typically defined through a mathematical expression, such as $A=\{n\in\mathbb{N} \mid n>5\}$ (the set of all natural numbers greater than five) or $B=\{n\in\mathbb{N} \mid n<10\}$ (the set of all natural numbers less than 10).

Relationships between data sets represented by the shapes of an Euler diagram can be visualised through intersections between the shapes. Using the example above, the intersection between shapes representing the sets A and B would be the set $A \cap B=\{n \in\mathbb{N} \mid n>5\}\cap\{n\in\mathbb{N} \mid n<10\}=\{n \in \mathbb{N} \mid 5<n<10\}$, i.e. all natural numbers greater than 5 and less than 10. This would be represented by two shapes having a single overlapping region. One of the shapes would represent set A (the numbers greater than 5), the other shape would represent the set B (the numbers less than 10), and the overlapping region would represent the numbers greater than 5 and less than 10.

Unlike Euler diagrams, Venn diagrams require all possible intersections between shapes to be shown. For example, an Euler diagram having two shapes representing odd and even numbers respectively would not have these shapes overlapping (as a number cannot be both odd and even), whereas a Venn diagram would have these shapes overlapping (with the intersection representing the empty set of numbers that are both odd and even).

The diagram 200 in FIG. 2 has three overlapping shapes 201, 202, 203 representing three respective data sets. In this example, shape 201 represents people having two or more cars, shape 202 represents people living in Tunbridge Wells, and shape 203 represents people who are homeowners.

Although the shapes 201-203 are all circles in this example, any shapes could be used, such as ovals, squares, or irregular shapes. In addition, the shapes can be different from each other.

All of the shapes 201, 202, 203 overlap in a central hatched region 204, which represents homeowners living in Tunbridge Wells having two or more cars. This region 204 is referred to as the highest intersection cardinality region of the diagram 200.

The intersection cardinality of a region within a shape is equal to the number of other shapes that intersect the shape in that region (i.e. excluding the shape in question). The intersection cardinality of a given region is therefore one less than the number of shapes that intersect at that region. Three shapes intersect at region 204, so the intersection cardinality of this region 204 is two.

In addition, shapes 201 and 202 intersect at a region 205, shapes 201 and 203 intersect at a region 206, and shapes 202 and 203 intersect at a region 207. The region 205 represents people having two or more cars living in Tunbridge Wells, the region 206 represents homeowners living in Tunbridge Wells, and the region 207 represents homeowners having two or more cars. The intersection cardinality of each of regions 205, 206 and 207 is one, because two shapes intersect at each of these regions.

FIG. 3 shows a more complex example of a diagram 300 representing a logical query. Shapes 301-303 correspond to shapes 201-203 respectively, and regions 304-307 correspond to regions 204-207 respectively. The diagram 300 has two additional shapes 308 and 309. Shape 308 represents people owning a mansion, and shape 309 represents people owning a supercar.

Region 310 therefore represents people living in Tunbridge Wells owning a mansion, and region 311 represents people living in Tunbridge Wells owning a supercar.

Intersection regions 310 and 311 have intersection cardinality one and are independent of each other and of intersection regions 304-306, i.e. they do not overlap any of these intersections. Therefore, although the cardinality of regions 310 and 311 is less than that of region 304, these regions are said to be included in the set of highest intersection cardinality regions of the diagram 300. While region 304 is the region of highest intersection cardinality within the shapes 301, 302 and 303, the regions 310 and 311 are respectively the regions of highest intersection cardinality in shapes 308 and 309.

Each of the diagrams 200 and 300 represents a logical predicate query. For the diagram 200, this query is:
Is resident of Tunbridge Wells AND Is homeowner AND Owns more than one car.
For the diagram 300, this query is:
Is resident of Tunbridge Wells AND ((Is homeowner AND Owns more than one car) OR Owns a mansion OR Owns a supercar).

I.e. the data to be selected by the logical predicate queries is corresponds to the set of highest intersection cardinality regions (the shaded regions in FIGS. 2 and 3.)

Diagrams can therefore be used to formulate such logical predicate queries by providing a user with a manipulatable diagram on a display device such as a computer screen. The user can select shapes corresponding to data sets of interest and manipulate the shapes to construct the desired query. This allows users to express complex predicate logic in a simple to understand, purely visual manner.

Such logic is widely used in computer software to describe things such as database queries (particularly the WHERE clauses of such queries), spreadsheet formulae, business intelligence tools, customer contact or marketing campaign creation and management and many other applications.

To date, the only way in which predicate logic may be conveyed to a computer system is through some type of high-level programming language such as SQL, macro, or C#. This requires the user to possess a certain level of technical skill. The method of the present invention provides users with a much more direct and intuitive manner of expressing predicate logic so that the definition of such logic becomes widely accessible to non-technical users.

While determining the regions where the shapes overlap is relatively straightforward (for example, the overlapping regions between circles can be determined geometrically based on the location of the centre of each circle and the radius of each circle), determining which intersection regions are of interest (i.e. the set of highest intersection cardinality regions—those that are shaded on FIGS. 2 and 3) is a non-trivial task for a computing device to perform.

In the above diagram 300, once the user has constructed the visual representation on a display device of the computing device 101, the computing device must identify the highest intersection cardinality regions 304, 310 and 311 to infer the user's intended logical query. The computing device 101 can then generate a machine processable form of the logical query such as a database query and send it to a query processing engine such as a database.

Figure 4:
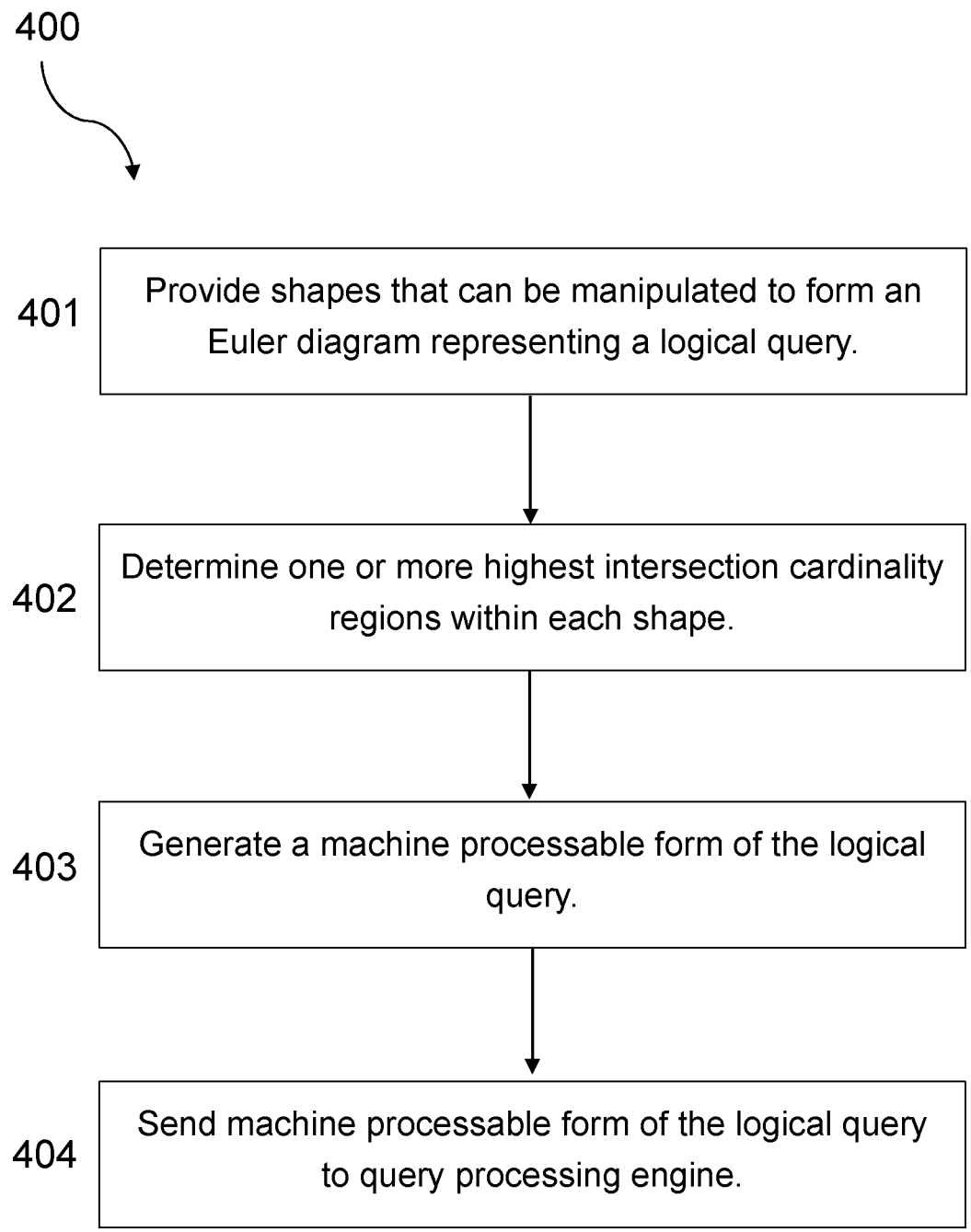
FIG. 4 is a flow diagram describing a method for generating and sending a machine processable form of a logical query.

A method 400 for performing this procedure is outlined in FIG. 4. At step 401, the user is provided with shapes that can be manipulated to form a diagram representing a logical query, such as an Euler diagram or Venn diagram or similar. The user can create shapes representing the relevant data sets, and manipulate them to form intersections representing the logical query.

At step 402, the computing device 101 determines one or more highest intersection cardinality regions in the diagram created by the user. In order to do this, the computing device 101 analyses each shape of the diagram in turn and determines the highest intersection cardinality region within that shape.

For example, for shape 301 of the diagram 300, the highest intersection cardinality region is region 304, which has intersection cardinality two; this is the region the computing device 101 is seeking to identify when analysing shape 301.

In order to identify the highest intersection cardinality region within a shape, the computing device 101 first generates an intersection set of all other shapes that intersect that shape, and an intersection value corresponding to the total number of shapes that intersect that shape.

In the case of shape 301, the intersection set would contain shapes 302, 303, 308 and 309, and the intersection value would be four (because four shapes intersect shape 301). Note that the intersection value is distinct from intersection cardinality.

In the following description, the term $S_i$ will be used to denote the ith shape (i=1, . . . , n where n is the total number of shapes). This term may also be used interchangeably to denote the data set associated with the ith shape; the usage will be clear from the context.

The intersection set and intersection value can be determined by analysing the layout of the shapes in the diagram and generating an n×n array such that each row and each column corresponds to one of the shapes $S_1, S_2, \ldots, S_n$ (e.g. shapes 301, 302, . . . , 309) and the value of each element of the array is either zero or one.

An element will be set to a value of 1 if the two shapes (designated by the column and the row) intersect, and will have a value of 0 if they do not intersect. The diagonal elements (where a shape refers to itself) are ignored (top left to bottom right diagonal).

The total of each row, represented by values $\varphi_i$, gives the intersection value for the associated shape $S_i$, i.e. $\varphi_i$ represents the total number of shapes (distinct from $S_i$ which have a non-empty intersection with $S_i$.

For the diagram 300, this array would be:

|       | $S_1$ | $S_2$ | $S_3$ | $S_4$ | $S_5$ | $\varphi_i$ |
|-------|-------|-------|-------|-------|-------|-------------|
| $S_1$ |       | 1     | 1     | 1     | 1     | 4           |
| $S_2$ | 1     |       | 1     | 0     | 0     | 2           |
| $S_3$ | 1     | 1     |       | 0     | 0     | 2           |
| $S_4$ | 1     | 0     | 0     |       | 0     | 1           |
| $S_5$ | 1     | 0     | 0     | 0     |       | 1           |

The array can also be used to determine the intersection set, which is denoted as $\Sigma_i = \{S_t | 1 \leq t \leq n, t \neq i, S_t \cap S_i \neq \emptyset\}$, i.e. the set containing all the shapes (distinct from $S_i$) which have a non-empty intersection with $S_i$. The intersection set can be obtained by determining the row corresponding to the shape $S_i$, identifying elements of that row having value one, determining the respective shapes corresponding to the respective columns of these elements, and generating a set of these shapes. The intersection set for the shape $S_1$ in the above table is therefore the set of shapes $\{S_2, S_3, S_4, S_5\}$.

The intersection set $\Sigma_i$ can then be used to determine the highest intersection cardinality value for each shape $S_i$ and the one or more highest intersection cardinality regions within the shape (i.e. the intersection regions within the shape having an intersection cardinality equal to the highest intersection cardinality value).

The highest intersection cardinality value for a shape $S_i$ can be determined by looping using an index p down from ($\varphi_i$ to zero. For each value of p, all subsets σ of the intersection set $\Sigma_i$ containing precisely p elements is generated. The number of such subsets is:

$$\binom{\varphi_i}{p} = \frac{\varphi_i!}{p!(\varphi_i - p)!}.$$

For each subset σ, the computing device 101 checks whether the intersection of all the shapes in the subset with the shape $S_i$ itself is non-empty, i.e. whether all shapes in a intersect with the shape $S_i$ at a common intersection. In other words, the computing device 101 checks whether:

$$\exists \sigma \in \binom{\Sigma_i}{p} \left\{ \left[ \left( \bigcap_{j=1}^{p} S_j \in \sigma \right) \cap S_i \right] \neq \phi \right\}.$$

If such a set exists, the computing device 101 defines p as the highest intersection cardinality value, determines all subsets σ for which the intersection of all the shapes in the subset σ with the shape $S_i$ itself is non-empty, and stops the loop. The sets σ correspond to the highest intersection cardinality regions within the shape $S_i$.

Any shapes that are disjoint from all other shapes will have a highest intersection cardinality equal to zero. In such cases the set corresponding to the disjoint shape will be included in the final expression in its entirety as the entire shape is included in the highest intersection cardinality region.

At this stage, the computing device 101 may optionally shade all regions within the shape having an intersection cardinality value equal to the highest intersection cardinality value. At least one such shaded intersection exists by definition.

Subsequently to or concurrently with the determination of the one or more highest intersection cardinality regions within each shape, in step 403 the computing device 101 generates a machine processable form of the logical query represented by the diagram.

This is achieved by constructing a set theory expression V representing the logical query, which is initially the empty set V=Ø. Once the computing device 101 has identified the sets of shapes that intersect with the shape $S_i$ with an intersection cardinality value equal to the highest intersection cardinality value, this intersection is appended to V such that:

$$V = V \cup \left( \left( \bigcap_{S_j \in \sigma} S_j \right) \cap S_i \right)$$

where Si represents a data set corresponding to the shape, σ represents a set of data sets corresponding to shapes that intersect the shape Si at the highest intersection cardinality region; and Sj represent respective data sets corresponding to respective elements of σ.

To keep the expression V as simplified as possible, the computing device 101 can optionally check before adding a new element to the expression V that an identical element does not already exist as part of the expression having been added by a previous value of $S_i$ in a previous step of the loop.

For such shapes with intersection cardinality of zero, the entire shape will be shaded, and the new element of V will simply be added as $V = V \cup S_i$.

Once the computing device 101 has looped through all of the shapes, the expression V will accurately describe the visual representation of the logical query created by the user by manipulating the diagram in step 401. V can subsequently be translated into a logic predicate or database query simply by replacing the intersections with ANDs and the unions with ORs. Furthermore, the predicate can be simplified by using Boolean algebra.

In the example of a database query, once the query has been generated by the computing device 101 it can be sent to the database to extract data based on the database query. The extracted data can then be sent to a receiving device, which could for example be the same computing device 101.

In the context of a call centre, the extracted data may be the details of customers to be contacted, including one or more phone numbers for each customer. The user of the computing device 101 can then use one of the phone numbers to make a phone call to a UE 104 of a customer, for example via the intermediary 103.

Returning to FIG. 3, a full example of the process for determining the one or more highest intersection cardinality regions of the diagram 300 will now be described.

In this example, a user manipulates the diagram 300 to represent the query:

Is resident of Tunbridge Wells AND ((Is homeowner AND Owns more than one car) OR Owns a mansion OR Owns a supercar)

as described above, where shape 301 represents people living in Tunbridge Wells, shape 302 represents people having two or more cars, shape 303 represents people who are homeowners, shape 308 represents people owning a mansion (e.g. this could be a house worth over £2,000,000), and shape 309 represents people owning a supercar (e.g. this could be a car worth over £100,000).

The user would create these conditions as shapes on the diagram and drag them to the configuration shown in FIG. 3 to express the query.

The computing device will then create the following array:

|       | $S_1$ | $S_2$ | $S_3$ | $S_4$ | $S_5$ | $\varphi_i$ |
|-------|-------|-------|-------|-------|-------|-------------|
| $S_1$ |       | 1     | 1     | 1     | 1     | 4           |
| $S_2$ | 1     |       | 1     | 0     | 0     | 2           |
| $S_3$ | 1     | 1     |       | 0     | 0     | 2           |
| $S_4$ | 1     | 0     | 0     |       | 0     | 1           |
| $S_5$ | 1     | 0     | 0     | 0     |       | 1           | where $S_1$ corresponds to shape 301 (or the respective data set), $S_2$ corresponds to shape 302 (or the respective data set), $S_3$ corresponds to shape 303 (or the respective data set), $S_4$ corresponds to shape 308 (or the respective data set), and $S_5$ corresponds to shape 309 (or the respective data set).

Next, the computing device 101 defines the intersection sets $\Sigma_1 = \{S_2, S_3, S_4, S_5\}$, $\Sigma_2 = \{S_1, S_3\}$, $\Sigma_3 = \{S_1, S_2\}$, $\Sigma_4 = \{S_1\}$ and $\Sigma_5 = \{S_1\}$.

For each value of i between one and five, the computing device 101 performs the following steps:

For each value of p between ($\varphi_i$ and 1, descending:
  Select each subset σ of $\Sigma_i$ with precisely p elements and check if all these elements have a common intersection and that intersection also intersects $S_i$.
  If YES, then set the highest intersection cardinality value equal to p and add the intersection of the sets in σ to the final expression V if not already in. Continue for all other subsets a of elements in $\Sigma_i$ with precisely p elements and then move the next value of i.
  If NOT, move to the next, lower, value of p.

For the diagram in FIG. 3, this process will be as follows:
i=1:
p=4:
  σ={$S_2, S_3, S_4, S_5$}
  The four sets in σ do not all have a common intersection with $S_1$.
p=3:
  σ={$S_2, S_3, S_4$}
  The three sets in σ do not all have a common intersection with $S_1$.
  σ={$S_3, S_4, S_5$}
  The three sets in σ do not all have a common intersection with $S_1$.
  σ={$S_2, S_3, S_5$}
  The three sets in σ do not all have a common intersection with $S_1$.
  σ={$S_2, S_4, S_5$}
  The three sets in σ do not all have a common intersection with $S_1$.
p=2:
  σ={$S_2, S_3$}
  The two sets in a do all have a common intersection with $S_1$ (i.e. region 304). Set $\rho_1$=2 ($\rho_1$ is the intersection cardinality for the shape $S_1$).
  V=$S_1$ AND $S_2$ AND $S_3$
  σ={$S_2, S_4$}
  The two sets in σ do not all have a common intersection with $S_1$.
  σ={$S_2, S_5$}
  The two sets in σ do not all have a common intersection with $S_1$.
  σ={$S_3, S_4$}
  The two sets in σ do not all have a common intersection with $S_1$.
  σ={$S_3, S_5$}
  The two sets in σ do not all have a common intersection with $S_1$.
  σ={$S_4, S_5$}
  The two sets in σ do not all have a common intersection with $S_1$.
i=2:
p=2:
  σ={$S_1, S_3$}
  The two sets in a both have a common intersection with $S_2$ (i.e. region 304). Set $p_2$=2.
  However, $S_1$ AND $S_2$ AND $S_3$ already in V so no need to add it again.
i=3:
p=2:
  σ={$S_1, S_2$}
  The two sets in a do both have a common intersection with $S_3$ (i.e. region 304). Set $p_3$=2.
  However, $S_1$ AND $S_2$ AND $S_3$ already in V so no need to add it again.
i=4:
p=1:
  σ={$S_1$}
  The one set in a does have a common intersection with $S_4$ (i.e. region 310). Set $p_4$=1.
  V=($S_1$ AND $S_2$ AND $S_3$) OR ($S_1$ AND $S_4$)
i=5:
p=1:
  σ={$S_1$}
  The one set in a does have a common intersection with $S_5$ (i.e. region 311). Set $p_5$=1.
  V=($S_1$ AND $S_2$ AND $S_3$) OR ($S_1$ AND $S_4$) OR ($S_1$ AND $S_5$)

V is now an expanded version of the original condition to be expressed. In other words:

V=($S_1$ AND $S_2$ AND $S_3$) OR ($S_1$ AND $S_4$) OR ($S_1$ AND $S_5$)
=("Lives in Tunbridge Wells" AND "Homeowner" AND "Owns two or more cars") OR
  ("Lives in Tunbridge Wells" AND "Owns a mansion") OR
  ("Lives in Tunbridge Wells" AND "Owns a supercar").

Using simple Boolean algebra, this can be simplified for conciseness. The same method can be used for colouring or shading the intersections on screen as for generating the expression, as both can be performed simultaneously. Each time a new element is added to the expression, the corresponding area on the screen can be coloured or shaded.

Although the above example has been given in relation to generating a database query, it will be understood that the same method can be used to generate any other logical query, such as a query for a search engine or a spreadsheet formula.

Figure 5:
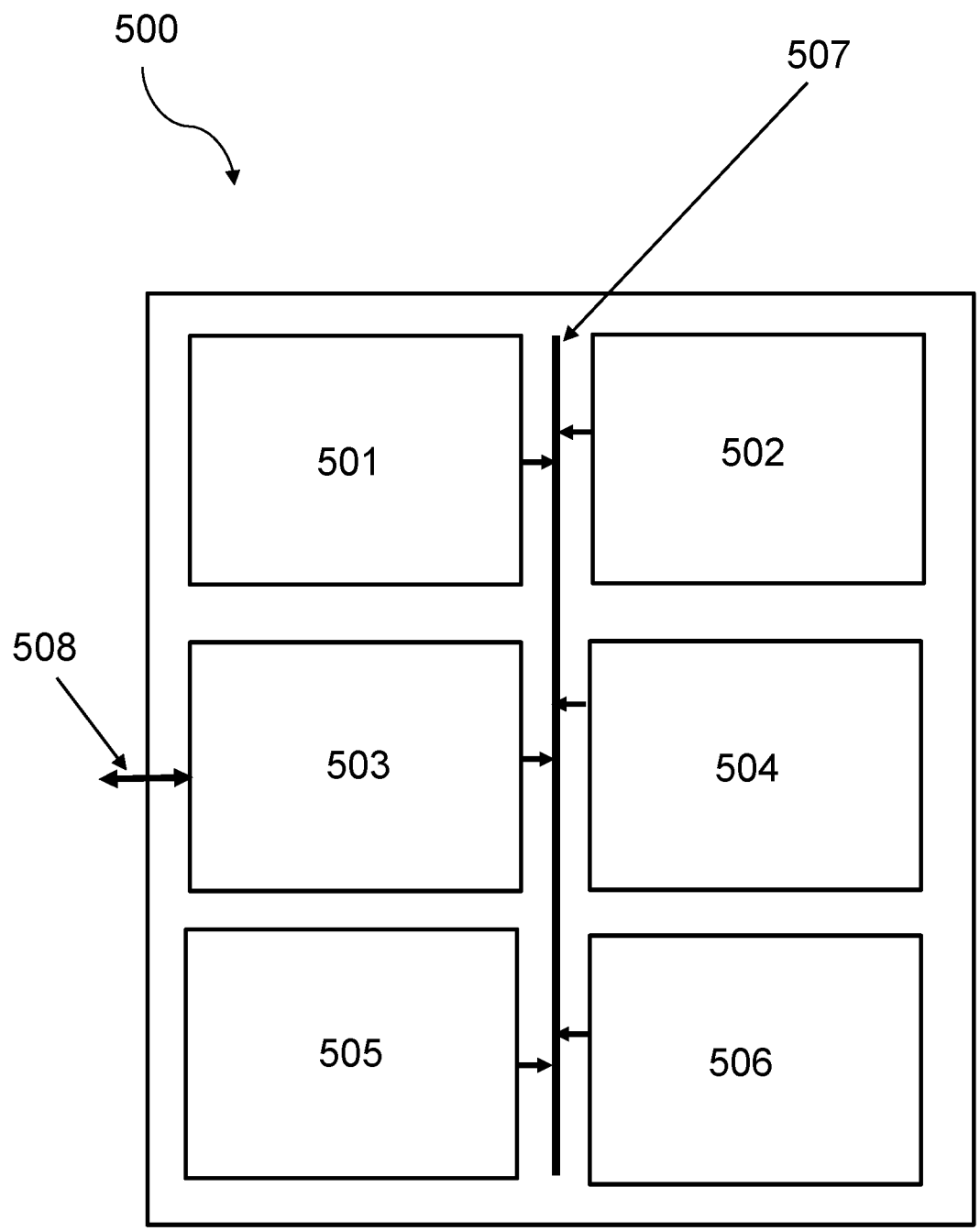
FIG. 5 shows in schematic form a data processing device that is suitable for performing the functions of the components of the system shown in FIG. 1.

It will be apparent to a person skilled in the art that the methods described herein are all suitable for implementation by a data processing device. By way of example, FIG. 5 shows in schematic form a data processing device 500 that is suitable for performing the functions of the computing device 101, the query processing engine 102, the UEs 104 or any other data processing device used in the above methods, such a receiving device or a server of an intermediary network.

The data processing device 600 includes a processor 501 for executing instructions. The instructions may be stored in a memory 502, for example. The processor 501 may include one or more processing units (e.g., in a multi-core configuration) for executing instructions.

The processor 501 may also be operatively coupled to a communication subsystem 503 such that data processing device 500 is capable of communicating with a remote device through a wired or wireless communications channel 508.

The processor 501 may also be operatively coupled to a storage device such as storage medium via a storage interface 504. The storage device can be any computer-operated hardware suitable for storing and/or retrieving data. In some cases, e.g. a remotely located storage medium, the communication subsystem 503 may perform the function of storage interface 504 such that these two entities are combined.

The storage medium can be integrated in data processing device 500, or it can be external to data processing device 500 and located remotely. For example, data processing device 500 may include one or more hard disk drives as a storage device.

The data processing device 500 may further comprise a user interface or display device 505 such as a monitor or touch screen, as well as a user input device 506 such as a mouse, keyboard, touchpad, touchscreen or microphone.

The components 501-506 of the data processing device 500 may be able to communicate via one or more buses 507.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The methods described herein may be encoded as executable instructions embodied in a computer readable medium, including, without limitation, a storage device, and/or a memory device. Such instructions, when executed by a processor, cause the processor to perform at least a portion of the methods described herein.

The invention claimed is:

1. A computer-implemented method for generating and sending a machine processable form of a logical query, comprising:
   providing, on a display device of a computing device, two or more shapes that can be manipulated by a user to form a diagram representing the logical query, wherein the two or more shapes correspond to respective data sets;
   for each shape of the two or more shapes, automatically determining, by the computing device, one or more highest intersection cardinality regions within the shape;
   based on the one or more highest intersection cardinality regions, generating, by the computing device, a machine processable form of the logical query, wherein the generating comprises translating a set theory expression into the logical query;
   constructing, by the computing device, the set theory expression V which initially is equal to an empty set; and
   sending, by the computing device, the machine processable form of the logical query to query processing engine,
   wherein determining the one or more highest intersection cardinality regions within the shape comprises:
      generating, by the computing device, an intersection set, the intersection set comprising all shapes that intersect the shape;
      determining, by the computing device, a highest intersection cardinality value of the shape;
      generating, by the computing device, a highest intersection cardinality index set, the highest intersection cardinality index set comprising all subsets of the intersection set that have a cardinality equal to the highest intersection cardinality value; and
      identifying, by the computing device, elements of the highest intersection cardinality index set that contain shapes having a common intersection with each other and with the shape, and
   wherein the determining the one or more highest intersection cardinality regions within the shape further comprises:
      for each determined highest intersection cardinality region within the shape, appending, by the computing device, a term $$\left(\left(\bigcap_{S_j \in \sigma} S_j\right) \cap S_i\right)$$

to V such that:

$$V = V \cup \left(\left(\bigcap_{S_j \in \sigma} S_j\right) \cap S_i\right)$$

where:
   $S_i$ represents a data set corresponding to the shape;
   $\sigma$ represents a set of data sets corresponding to shapes that intersect the shape at the determined highest intersection cardinality region; and
   $S_j$ represent respective data sets corresponding to respective elements of $\sigma$.

2. The method of claim 1, wherein the method further comprises:
   generating, by the computing device, an n×n array, wherein n represents a total number of shapes, wherein each row and each column of the array corresponds to a respective shape, and wherein an element of the array has value 1 if respective shapes corresponding to the row and the column of the element intersect, and value 0 otherwise; and
   wherein generating the intersection set comprises:
      determining, by the computing device, the row corresponding to the shape;
      identifying, by the computing device, elements of the row that have value 1;
      determining, by the computing device, respective shapes corresponding to respective columns of the identified elements; and
      generating, by the computing device, a set comprising the respective shapes.

3. The method of claim 2, wherein determining the highest intersection cardinality value of the shape comprises:
   (i) determining, by the computing device, utilising the n×n array, an intersection value of the shape, wherein the intersection value is equal to the number of shapes that intersect with the shape;
   (ii) setting, by the computing device an index equal to the intersection value;
   (iii) generating, by the computing device, an index set comprising all subsets of the intersection set that have a set cardinality equal to the index;
   (iv) for each element of the index set, determining, by the computing device, whether all shapes in the element intersect with the shape at a common intersection; and
   (v) if all shapes in the element intersect with the shape at a common intersection, setting, by the computing device, the highest intersection cardinality value equal to the index, and otherwise decreasing, by the computing device, the value of the index by 1 and repeating steps (iii) and (iv).

4. The method of claim 1, wherein identifying elements of the highest intersection cardinality index set that contain shapes having a common intersection with each other and with the shape comprises:
   iterating, by the computing device, through the elements of the highest intersection cardinality index set; and for each element, determining, by the computing device, whether all shapes in the element intersect with the shape at a common intersection.

5. The method of claim 1, wherein generating the machine processable form of the logical query comprises, subsequent to determining the one or more highest intersection cardinality regions within the shape, converting, by the computing device, the set theory expression V into the machine processable form of the logical query.

6. The method of claim 1, further comprising determining, by the computing device, whether the term already exists in V prior to the appending, wherein the term is only appended to V if an identical term does not already exist in V.

7. The method of claim 1, further comprising determining, by the computing device, all intersection regions between the two or more shapes.

8. The method of claim 1, further comprising shading, on the display device, the one or more highest intersection cardinality regions.

9. The method of claim 1, wherein the logical query is a database query.

10. The method of claim 1, wherein the query processing engine is a database.

11. The method of claim 1, wherein the diagram is an Euler diagram or a Venn diagram.

12. A computer-implemented method of retrieving data from a data store, comprising:
generating, according to the method of claim 1, by a computing device, a machine processable form of a logical query and sending, by the computing device, the machine processable form of the logical query to the query processing engine, wherein the machine processable form of the logical query is a data store query and the query processing engine is the data store;
receiving, at the data store, the data store query; and
retrieving, at the data store, the data based on the data store query.

13. The method of claim 12, further comprising sending the data to a receiving device.

14. The method of claim 12, wherein the method is used in a call centre, wherein the data comprises one or more phone numbers, and wherein the method further comprises making a phone call based on at least one of the one or more phone numbers.

15. A computing device for generating and sending a machine processable form of a logical query, comprising:
a processor; and
a display device;
wherein the processor is configured to perform the method of claim 1.

16. A system for making logical queries, comprising:
a computing device configured to generate a machine processable form of a logical query and send the machine processable form of a logical query to a query processing engine according to the method of claim 1;
a query processing engine configured to:
receive the machine processable form of a logical query from the computing device;
extract data based on the machine processable form of a logical query; and
send the data to a receiving device; and
a receiving device configured to receive the data from the query processing engine.

\* \* \* \* \*